United States Patent
Schaeferjohann

(10) Patent No.: US 10,452,136 B2
(45) Date of Patent: Oct. 22, 2019

(54) METHOD FOR CONTROLLING THE DISPLAYING OF TEXT FOR AIDING READING ON A DISPLAY DEVICE, AND APPARATUS ADAPTED FOR CARRYING OUT THE METHOD, COMPUTER PROGRAM, AND COMPUTER READABLE STORAGE MEDIUM

(71) Applicant: THOMSON LICENSING, Issy les Moulineaux (FR)

(72) Inventor: Volker Schaeferjohann, Barsinghausen (DE)

(73) Assignee: Thomson Licensing, Cesson-Sevigne (FR)

( * ) Notice: Subject to any disclaimer, the term of this patent is extended or adjusted under 35 U.S.C. 154(b) by 91 days.

(21) Appl. No.: 15/518,476

(22) PCT Filed: Oct. 2, 2015

(86) PCT No.: PCT/EP2015/072849
§ 371 (c)(1),
(2) Date: Apr. 11, 2017

(87) PCT Pub. No.: WO2016/058847
PCT Pub. Date: Apr. 21, 2016

(65) Prior Publication Data
US 2017/0228018 A1   Aug. 10, 2017

(30) Foreign Application Priority Data

Oct. 13, 2014 (EP) ..................................... 14306616
Mar. 16, 2015 (EP) ..................................... 15159255

(51) Int. Cl.
*G06F 3/01* (2006.01)
*A61B 3/113* (2006.01)
(Continued)

(52) U.S. Cl.
CPC ............ *G06F 3/013* (2013.01); *G06F 3/0483* (2013.01); *G06K 9/00604* (2013.01);
(Continued)

(58) Field of Classification Search
CPC ... G06T 7/11; G06T 7/149; G06T 7/12; G06T 7/74; G06T 2207/20081; G06K 9/00617;
(Continued)

(56) References Cited

U.S. PATENT DOCUMENTS 6,404,416 B1   6/2002   Kahn et al.
6,496,218 B2  12/2002   Takigawa et al.
(Continued)

FOREIGN PATENT DOCUMENTS

CN   202995626   6/2013
EP     2302615   3/2011
(Continued)

OTHER PUBLICATIONS

Chakraborty et al., "Overcoming a Fundamental Display Limitation: The Mouse-Less Visual Cursor", Medical Physics, vol. 31, No. 6, Jun. 2004, Abstract, p. 1.

(Continued)

*Primary Examiner* — Sardis F Azongha
(74) *Attorney, Agent, or Firm* — Vincent E. Duffy

(57) ABSTRACT

This invention aims to support the reader in the task of reading text on a display device (21). In each case an area in the text to which the gaze is directed (view areas/focus area of the eyes) is highlighted, respectively. For this purpose the gaze direction is determined (101 to 108) in the reading device (21) and the highlighted region is controlled with gaze direction control (109). When a whole sentence is highlighted, the highlighting is stopped and starts anew with the beginning of the next sentence being read. The highlighted area moves with this technique with the view. The (Continued)

reader's eye/brain is thus released from the complicated task of line tracking and can better concentrate on word recognition.

12 Claims, 15 Drawing Sheets

(51) Int. Cl.
*A61B 3/00* (2006.01)
*G06F 3/0483* (2013.01)
*G06K 9/00* (2006.01)
*G06T 7/11* (2017.01)

(52) U.S. Cl.
CPC ............ *G06K 9/00617* (2013.01); *G06T 7/11* (2017.01); *G06T 2207/20081* (2013.01)

(58) Field of Classification Search
CPC .. G06K 9/00604; G06K 9/4604; G06F 3/013; G06F 3/012; G06F 3/048; G06F 3/0483
See application file for complete search history.

(56) References Cited

U.S. PATENT DOCUMENTS

| | | | |
|---|---|---|---|
| 6,553,281 B1 | 4/2003 | Liu et al. | |
| 8,493,390 B2* | 7/2013 | Kalinli | G06F 3/1415 345/428 |
| 8,499,257 B2 | 7/2013 | Mattingly et al. | |
| 2003/0090751 A1* | 5/2003 | Itokawa | H04N 19/51 358/538 |
| 2006/0110030 A1* | 5/2006 | Sung | G06K 9/00597 382/159 |
| 2006/0256083 A1* | 11/2006 | Rosenberg | G06F 3/013 345/156 |
| 2006/0281969 A1 | 12/2006 | Wang et al. | |
| 2011/0298702 A1 | 12/2011 | Sakata et al. | |
| 2012/0105617 A1* | 5/2012 | Yoon | G06T 7/60 348/80 |
| 2012/0189160 A1 | 7/2012 | Kaneda et al. | |
| 2012/0256967 A1* | 10/2012 | Baldwin | G06F 3/013 345/684 |
| 2012/0293528 A1 | 11/2012 | Larsen | |
| 2013/0021373 A1 | 1/2013 | Vaught et al. | |
| 2013/0222644 A1 | 8/2013 | Son et al. | |
| 2013/0300653 A1* | 11/2013 | Lewis | A61B 3/113 345/156 |
| 2015/0116493 A1* | 4/2015 | Bala | G06K 9/00845 348/148 |

FOREIGN PATENT DOCUMENTS

| | | |
|---|---|---|
| EP | 2573650 | 3/2013 |
| GB | 2369673 | 6/2002 |
| WO | WO2010/142455 | 12/2010 |
| WO | WO2014155133 | 10/2014 |

OTHER PUBLICATIONS

Zhou et al., "Visual Mouse: SIFT Detection and PCA Recognition", 2007 International Conference on Computational Intelligence and Security Workshops, Harbin, China, Dec. 15, 2007, pp. 263-266.
Atyabi et al., "The Webcam Mouse: Visual 3D Tracking of Body Features to Provide Computer Access for People with Severe Disabilities", 2006 Annual IEEE India Conference, New Delhi, India, Sep. 15, 2006, pp. 1-6.

* cited by examiner

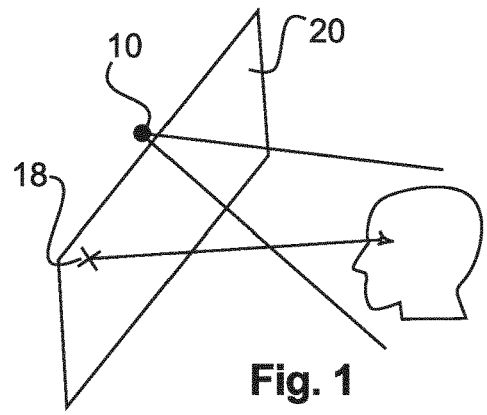
Fig. 1
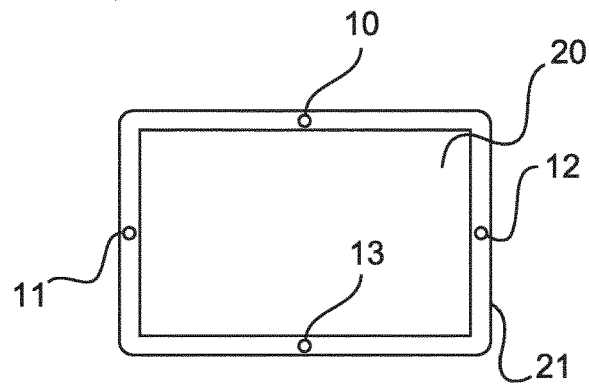
Fig. 2
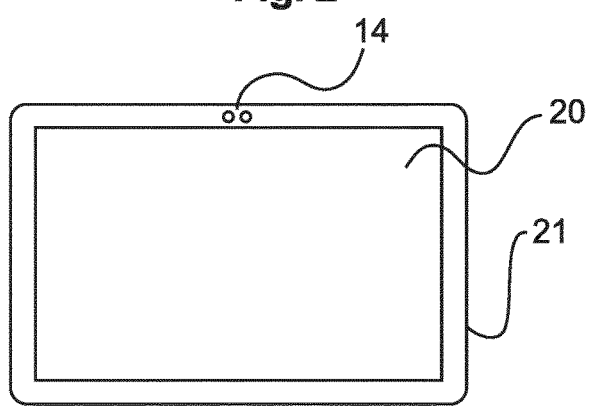
Fig. 3
| +S1 | S2 | S3 |
|---|---|---|
| S4 | S5 | S6 |
| S7 | S8 | S9 |
Fig. 4

| S1 | S2 | S3 | S4 | S5 | S6 | S7 | S8 | S9 |
|---|---|---|---|---|---|---|---|---|
| S10 | S11 | S12 | S13 | S14 | S15 | S16 | S17 | S18 |
| S19 | S20 | S21 | S22 | S23 | S24 | S25 | S26 | S27 |
| S28 | S29 | S30 | S31 | S32 | S33 | S34 | S35 | S36 |
| S37 | S38 | S39 | S40 | S41 | S42 | S43 | S44 | S45 |
| S46 | S47 | S48 | S49 | S50 | S51 | S52 | S53 | S54 |
| S55 | S56 | S57 | S58 | S59 | S60 | S61 | S62 | S63 |
| S64 | S65 | S66 | S67 | S68 | S69 | S70 | S71 | S72 |
| S73 | S74 | S75 | S76 | S77 | S78 | S79 | S80 | S81 |
| S82 | S83 | S84 | S85 | S86 | S87 | S88 | S89 | S90 |
| S91 | S92 | S93 | S94 | S95 | S96 | S97 | S98 | S99 |
| S100 | S101 | S102 | S103 | S104 | S105 | S106 | S107 | S108 |
| S109 | S110 | S111 | S112 | S113 | S114 | S115 | S116 | S117 |
| S118 | S119 | S120 | S121 | S122 | S123 | S124 | S125 | S126 |
| S127 | S128 | S129 | S130 | S140 | S141 | S142 | S143 | S144 |
| S145 | S146 | S147 | S148 | S149 | S150 | S151 | S152 | S153 |
| S154 | S155 | S156 | S157 | S158 | S159 | S160 | S161 | S162 |
| S163 | S164 | S165 | S166 | S167 | S168 | S169 | S170 | S171 |
| S172 | S173 | S174 | S175 | S176 | S177 | S178 | S179 | S180 | according to Fig. 3c it is clear immediately that the data packet is delayed if the time stamp of the data packet is greater than the current bus time. If it is smaller, individual comparisons must correspondingly be made again with the stored time limits. For all three cases there are separate algorithms with which it is possible to determine, in a way which is favourable in terms of effort, in which of the regions the time stamp of the data packet lies. For example, in the case according to Fig. 3a, it is initially checked whether the time stamp is smaller than the current bus time. If it is, it is clear that the data packet is delayed. If it is not, it is checked whether the time stamp is greater than the lower limit of the "correctly timed" region. If it is not, it is clear that the data packet is delayed. If it is, it is additionally checked whether the time stamp of the data packet is greater than the upper limit of the "correctly timed" region. If it is, it is also clear that the data packet is delayed; if not it is clear that the data packet is correctly timed. The corresponding algorithms for the cases in Figs. 3b and c can be taken in each case from Figs. 3b and c themselves, and do not need to be explained individually.

Fig. 4 illustrates once more the essential components for checking the up-to-datedness of the data packets in the equipment which is to be transmitting. Identical reference numbers designate the same as in Fig. 2. The reference number 40 designates the evaluation unit which carries out the various comparison operations. The reference number 42 designates the buffer (RAM). The reference number 41 designates a memory access control unit. The reference number 44 designates a reading unit which carries out, as it were, a logic AND operation. The reference number 43 designates an interrupt register.

The AV interface 21 writes a data packet which it wishes to transmit via the bus into the memory 42. In the process, said interface 21 has entered into the data packet the time stamp which it has determined by offset addition. This also takes place again in relation to the current bus time, which is also available to the AV interface. The evaluation unit 40 requests a data transmission via the bus, which is carried out in co-operation with the IEEE 1394 interface 23. If the bus is available to the subscriber station, the evaluation unit 40 reads out from the memory 42 the data packet which is to be transmitted, and carries out the check of the up-to-datedness of the data packet as previously described. If it is determined here that it is already too late to transmit the packet, the evaluation unit 40 generates a corresponding signal and passes this onto the memory access control unit 41. In response, the next data packet which is in line to be transmitted is read from the memory 42. If the result of the check here was that the time stamp of the data packet lies in the "correctly timed" region, a corresponding signal is passed onto the memory access control unit 41 and is released from there for the reading operation. The data packet is passed on to the IEEE 1394 Bus interface and transmitted via the bus. Given a specific number of data packets which are successively delayed, a bit is set in the interrupt register 43 by the evaluation unit 40. As a result, reconfiguration of the system and/or error recovery is brought about.

Fig. 16 according to Fig. 3c it is clear immediately that the data packet is delayed if the time stamp of the data packet is greater than the current bus time. If it is smaller, individual comparisons must correspondingly be made again with the stored time limits. For all three cases there are separate algorithms with which it is possible to determine, in a way which is favourable in terms of effort, in which of the regions the time stamp of the data packet lies. For example, in the case according to Fig. 3a, it is initially checked whether the time stamp is smaller than the current bus time. If it is, it is clear that the data packet is delayed. If it is not, it is checked whether the time stamp is greater than the lower limit of the "correctly timed" region. If it is not, it is clear that the data packet is delayed. If it is, it is additionally checked whether the time stamp of the data packet is greater than the upper limit of the "correctly timed" region. If it is, it is also clear that the data packet is delayed; if not it is clear that the data packet is correctly timed. The corresponding algorithms for the cases in Figs. 3b and c can be taken in each case from Figs. 3b and c themselves, and do not need to be explained individually.

Fig. 4 illustrates once more the essential components for checking the up-to-datedness of the data packets in the equipment which is to be transmitting. Identical reference numbers designate the same as in Fig. 2. The reference number 40 designates the evaluation unit which carries out the various comparison operations. The reference number 42 designates the buffer (RAM). The reference number 41 designates a memory access control unit. The reference number 44 designates a reading unit which carries out, as it were, a logic AND operation. The reference number 43 designates an interrupt register.

The AV interface 21 writes a data packet which it wishes to transmit via the bus into the memory 42. In the process, said interface 21 has entered into the data packet the time stamp which it has determined by offset addition. This also takes place again in relation to the current bus time, which is also available to the AV interface. The evaluation unit 40 requests a data transmission via the bus, which is carried out in co-operation with the IEEE 1394 interface 23. If the bus is available to the subscriber station, the evaluation unit 40 reads out from the memory 42 the data packet which is to be transmitted, and carries out the check of the up-to-dateness of the data packet as previously described. If it is determined here that it is already too late to transmit the packet, the evaluation unit 40 generates a corresponding signal and passes this onto the memory access control unit 41. In response, the next data packet which is in line to be transmitted is read from the memory 42. If the result of the check here was that the time stamp of the data packet lies in the "correctly timed" region, a corresponding signal is passed onto the memory access control unit 41 and is released from there for the reading operation. The data packet is passed on to the IEEE 1394 Bus interface and transmitted via the bus. Given a specific number of data packets which are successively delayed, a bit is set in the interrupt register 43 by the evaluation unit 40. As a result, reconfiguration of the system and/or error recovery is brought about.

Fig. 17 according to Fig. 3c it is clear immediately that the data packet is delayed if the time stamp of the data packet is greater than the current bus time. If it is smaller, individual comparisons must correspondingly be made again with the stored time limits. For all three cases there are separate algorithms with which it is possible to determine, in a way which is favourable in terms of effort, in which of the regions the time stamp of the data packet lies. For example, in the case according to Fig. 3a, it is initially checked whether the time stamp is smaller than the current bus time. If it is, it is clear that the data packet is delayed. If it is not, it is checked whether the time stamp is greater than the lower limit of the "correctly timed" region. If it is not, it is clear that the data packet is delayed. If it is, it is additionally checked whether the time stamp of the data packet is greater than the upper limit of the "correctly timed" region. If it is, it is also clear that the data packet is delayed; if not it is clear that the data packet is correctly timed. The corresponding algorithms for the cases in Figs. 3b and c can be taken in each case from Figs. 3b and c themselves, and do not need to be explained individually.

Fig. 4 illustrates once more the essential components for checking the up-to-datedness of the data packets in the equipment which is to be transmitting. Identical reference numbers designate the same as in Fig. 2. The reference number 40 designates the evaluation unit which carries out the various comparison operations. The reference number 42 designates the buffer (RAM). The reference number 41 designates a memory access control unit. The reference number 44 designates a reading unit which carries out, as it were, a logic AND operation. The reference number 43 designates an interrupt register.

The AV interface 21 writes a data packet which it wishes to transmit via the bus into the memory 42. In the process, said interface 21 has entered into the data packet the time stamp which it has determined by offset addition. This also takes place again in relation to the current bus time, which is also available to the AV interface. The evaluation unit 40 requests a data transmission via the bus, which is carried out in co-operation with the IEEE 1394 interface 23. If the bus is available to the subscriber station, the evaluation unit 40 reads out from the memory 42 the data packet which is to be transmitted, and carries out the check of the up-to-dateness of the data packet as previously described. If it is determined here that it is already too late to transmit the packet, the evaluation unit 40 generates a corresponding signal and passes this onto the memory access control unit 41. In response, the next data packet which is in line to be transmitted is read from the memory 42. If the result of the check here was that the time stamp of the data packet lies in the "correctly timed" region, a corresponding signal is passed onto the memory access control unit 41 and is released from there for the reading operation. The data packet is passed on to the IEEE 1394 Bus interface and transmitted via the bus. Given a specific number of data packets which are successively delayed, a bit is set in the interrupt register 43 by the evaluation unit 40. As a result, reconfiguration of the system and/or error recovery is brought about.

Fig. 18 according to Fig. 3c it is clear immediately that the data packet is delayed if the time stamp of the data packet is greater than the current bus time. If it is smaller, individual comparisons must correspondingly be made again with the stored time limits. For all three cases there are separate algorithms with which it is possible to determine, in a way which is favourable in terms of effort, in which of the regions the time stamp of the data packet lies. For example, in the case according to Fig. 3a, it is initially checked whether the time stamp is smaller than the current bus time. If it is, it is clear that the data packet is delayed. If it is not, it is checked whether the time stamp is greater than the lower limit of the "correctly timed" region. If it is not, it is clear that the data packet is delayed. If it is, it is additionally checked whether the time stamp of the data packet is greater than the upper limit of the "correctly timed" region. If it is, it is also clear that the data packet is delayed; if not it is clear that the data packet is correctly timed. The corresponding algorithms for the cases in Figs. 3b and c can be taken in each case from Figs. 3b and c themselves, and do not need to be explained individually.

Fig. 4 illustrates once more the essential components for checking the up-to-datedness of the data packets in the equipment which is to be transmitting. Identical reference numbers designate the same as in Fig. 2. The reference number 40 designates the evaluation unit which carries out the various comparison operations. The reference number 42 designates the buffer (RAM). The reference number 41 designates a memory access control unit. The reference number 44 designates a reading unit which carries out, as it were, a logic AND operation. The reference number 43 designates an interrupt register.

The AV interface 21 writes a data packet which it wishes to transmit via the bus into the memory 42. In the process, said interface 21 has entered into the data packet the time stamp which it has determined by offset addition. This also takes place again in relation to the current bus time, which is also available to the AV interface. The evaluation unit 40 requests a data transmission via the bus, which is carried out in co-operation with the IEEE 1394 interface 23. If the bus is available to the subscriber station, the evaluation unit 40 reads out from the memory 42 the data packet which is to be transmitted, and carries out the check of the up-to-dateness of the data packet as previously described. If it is determined here that it is already too late to transmit the packet, the evaluation unit 40 generates a corresponding signal and passes this onto the memory access control unit 41. In response, the next data packet which is in line to be transmitted is read from the memory 42. If the result of the check here was that the time stamp of the data packet lies in the "correctly timed" region, a corresponding signal is passed onto the memory access control unit 41 and is released from there for the reading operation. The data packet is passed on to the IEEE 1394 Bus interface and transmitted via the bus. Given a specific number of data packets which are successively delayed, a bit is set in the interrupt register 43 by the evaluation unit 40. As a result, reconfiguration of the system and/or error recovery is brought about.

Fig. 19 according to Fig. 3c it is clear immediately that the data packet is delayed if the time stamp of the data packet is greater than the current bus time. If it is smaller, individual comparisons must correspondingly be made again with the stored time limits. For all three cases there are separate algorithms with which it is possible to determine, in a way which is favourable in terms of effort, in which of the regions the time stamp of the data packet lies. For example, in the case according to Fig. 3a, it is initially checked whether the time stamp is smaller than the current bus time. If it is, it is clear that the data packet is delayed. If it is not, it is checked whether the time stamp is greater than the lower limit of the "correctly timed" region. If it is not, it is clear that the data packet is delayed. If it is, it is additionally checked whether the time stamp of the data packet is greater than the upper limit of the "correctly timed" region. If it is, it is also clear that the data packet is delayed; if not it is clear that the data packet is correctly timed. The corresponding algorithms for the cases in Figs. 3b and c can be taken in each case from Figs. 3b and c themselves, and do not need to be explained individually.

Fig. 4 illustrates once more the essential components for checking the up-to-datedness of the data packets in the equipment which is to be transmitting. Identical reference numbers designate the same as in Fig. 2. The reference number 40 designates the evaluation unit which carries out the various comparison operations. The reference number 42 designates the buffer (RAM). The reference number 41 designates a memory access control unit. The reference number 44 designates a reading unit which carries out, as it were, a logic AND operation. The reference number 43 designates an interrupt register.

The AV interface 21 writes a data packet which it wishes to transmit via the bus into the memory 42. In the process, said interface 21 has entered into the data packet the time stamp which it has determined by offset addition. This also takes place again in relation to the current bus time, which is also available to the AV interface. The evaluation unit 40 requests a data transmission via the bus, which is carried out in co-operation with the IEEE 1394 interface 23. If the bus is available to the subscriber station, the evaluation unit 40 reads out from the memory 42 the data packet which is to be transmitted, and carries out the check of the up-to-dateness of the data packet as previously described. If it is determined here that it is already too late to transmit the packet, the evaluation unit 40 generates a corresponding signal and passes this onto the memory access control unit 41. In response, the next data packet which is in line to be transmitted is read from the memory 42. If the result of the check here was that the time stamp of the data packet lies in the "correctly timed" region, a corresponding signal is passed onto the memory access control unit 41 and is released from there for the reading operation. The data packet is passed on to the IEEE 1394 Bus interface and transmitted via the bus. Given a specific number of data packets which are successively delayed, a bit is set in the interrupt register 43 by the evaluation unit 40. As a result, reconfiguration of the system and/or error recovery is brought about.

Fig. 20 according to Fig. 3c it is clear immediately that the data packet is delayed if the time stamp of the data packet is greater than the current bus time. If it is smaller, individual comparisons must correspondingly be made again with the stored time limits. For all three cases there are separate algorithms with which it is possible to determine, in a way which is favourable in terms of effort, in which of the regions the time stamp of the data packet lies. For example, in the case according to Fig. 3a, it is initially checked whether the time stamp is smaller than the current bus time. If it is, it is clear that the data packet is delayed. If it is not, it is checked whether the time stamp is greater than the lower limit of the "correctly timed" region. If it is not, it is clear that the data packet is delayed. If it is, it is additionally checked whether the time stamp of the data packet is greater than the upper limit of the "correctly timed" region. If it is, it is also clear that the data packet is delayed; if not it is clear that the data packet is correctly timed. The corresponding algorithms for the cases in Figs. 3b and c can be taken in each case from Figs. 3b and c themselves, and do not need to be explained individually.

Fig. 4 illustrates once more the essential components for checking the up-to-datedness of the data packets in the equipment which is to be transmitting. Identical reference numbers designate the same as in Fig. 2. The reference number 40 designates the evaluation unit which carries out the various comparison operations. The reference number 42 designates the buffer (RAM). The reference number 41 designates a memory access control unit. The reference number 44 designates a reading unit which carries out, as it were, a logic AND operation. The reference number 43 designates an interrupt register.

The AV interface 21 writes a data packet which it wishes to transmit via the bus into the memory 42. In the process, said interface 21 has entered into the data packet the time stamp which it has determined by offset addition. This also takes place again in relation to the current bus time, which is also available to the AV interface. The evaluation unit 40 requests a data transmission via the bus, which is carried out in co-operation with the IEEE 1394 interface 23. If the bus is available to the subscriber station, the evaluation unit 40 reads out from the memory 42 the data packet which is to be transmitted, and carries out the check of the up-to-dateness of the data packet as previously described. If it is determined here that it is already too late to transmit the packet, the evaluation unit 40 generates a corresponding signal and passes this onto the memory access control unit 41. In response, the next data packet which is in line to be transmitted is read from the memory 42. If the result of the check here was that the time stamp of the data packet lies in the "correctly timed" region, a corresponding signal is passed onto the memory access control unit 41 and is released from there for the reading operation. The data packet is passed on to the IEEE 1394 Bus interface and transmitted via the bus. Given a specific number of data packets which are successively delayed, a bit is set in the interrupt register 43 by the evaluation unit 40. As a result, reconfiguration of the system and/or error recovery is brought about.

Fig. 21

METHOD FOR CONTROLLING THE DISPLAYING OF TEXT FOR AIDING READING ON A DISPLAY DEVICE, AND APPARATUS ADAPTED FOR CARRYING OUT THE METHOD, COMPUTER PROGRAM, AND COMPUTER READABLE STORAGE MEDIUM

This application claims the benefit, under 35 U.S.C. § 365 of International Application PCT/EP2015/072849, filed Oct. 2, 2015, which was published in accordance with PCT Article 21(2) on Apr. 21, 2016, in English, and which claims the benefit of European Patent Application No. 14306616.5 filed Oct. 13, 2014 and European Patent Application No. 15159255.7 filed Mar. 16, 2015.

TECHNICAL FIELD

The invention relates to a method for controlling the displaying of text on a display device and an apparatus adapted for carrying out the method according to the invention. Likewise the invention also concerns a computer program and a computer readable storage medium for storing software which is used to implement the method according the invention. The invention may also be used for controlling a computer mouse with the help of view direction control.

BACKGROUND OF THE INVENTION

Today's reading behavior of readers has changed drastically. More and more texts are distributed electronically and read on a display device, such as computer monitor, notebook computer, tablet computer, E-book reading device, smart phones or even on high resolution TV sets. The reading of long texts with small print is a strenuous employment, especially of complex texts for the eyes and the brain.

INVENTION

This invention aims to support the reader in the task of reading text on a display device. Particularly when reading on large display screens, such as 21", 24", 27" and bigger, the disclosed invention can improve the reading experience much.

This object is achieved by a method having the features of claim 1, by an apparatus having the features according to claim 16, by a computer readable medium according to claim 18 and a computer program according to claim 19. Advantageous embodiments of the invention are defined in the dependent claims.

In support of the concentrated reading the following is proposed:

In each case an area in the text to which the gaze is directed (view areas/focus area of the eyes) is highlighted, respectively. For this purpose the gaze direction will be determined in the reading device and the highlight region will be controlled with gaze direction control. Usually the skilled reader captures in a ⅓ s the focused words. It is usually only one to three words which are detected during an eye fixation. If this area is highlighted, as the eye gets better orientation in the text, the text can be read more quickly or at least with less effort. The highlighted area moves with this technique with the view. The reader's eye/brain is thus released from the complicated task of line tracking and can better concentrate on word recognition.

The text section in which the focus progresses can be highlighted for the reader through frame, underlining, character color, background color, different font, bigger line spacing, colour gradient, text effect like 3D effect or the like in any combination.

As a further improvement it can be used in the highlighted section of text a different typography (font, font size, font style like bold or italic, etc.). As appropriate font for better legibility a sans serif font such as Microsoft Sans Serif or Gill Sans comes into question. In the focus area an increase of the font size, is used at the eye fixation position for highlighting to improve the legibility.

The process of highlighting text during reading may be in the form of starting highlighting text when the user's gaze is directed to the beginning of a sentence. Then as the user's gaze progresses, more and more sections of the sentence will be highlighted successively. This proceeds further until the whole sentence is highlighted. This has the advantage that user's gaze may quickly jump back to the beginning of the sentence without need to search for it if the user feels that he has not understood the sentence and needs to read it once more.

If the user has finished reading that sentence and the user's gaze steps further to the next sentence, the highlighting of the previous sentence will be cancelled and the beginning of the next sentence will be highlighted.

In a further embodiment of the invention the highlighting region precedes the actual user's gaze by one or more screen segment. This helps to support the reader because the gaze can follow the highlighting region as it advances which provides even better orientation in the text.

For gaze direction determination a known eye tracking technique may be used. Such a technique is e.g. described in U.S. Pat. No. 6,553,281 B1. Since these eye tracking techniques deliver accurate results but work with IR light radiation transmitted to the user's eyes and use of IR cameras for detecting the reflected IR light, they are pretty expensive to implement in consumer electronic devices like personal computers including computer monitors, notebook computers, tablet computers, smart phones, Ebook readers or TV sets. A disadvantage might also be that the customers don't like to be exposed to the additional IR radiation that is directed to the eyes.

In another embodiment, the view direction tracking is performed successively from time to time or periodically with a certain time distance and in that embodiment the highlighting region advances with a determined speed in the interval between two successive view direction tracking steps. Such an embodiment is very resource saving in terms of processor load and/or battery capacity in particular if it is used in a handheld device.

For determining the speed with which the highlight region advances it is advantageous to derive the speed from the determined speed in one or more of the previous intervals.

In one embodiment of the invention it is therefore proposed to capture the user's face with a normal camera e.g. a webcam with which the above mentioned devices are anyhow equipped and determine the gaze direction with the help of image processing techniques.

In a further embodiment it is proposed to divide the display screen area into a plurality of segments, and with head position processing it is determined to which segment the user's gaze, is directed to. Here, it is advantageous that during a training phase with the user in which the user is asked to look at certain segments of the display screen and where in each case a corresponding image is captured of which in each case the corresponding head position is extracted and archived, and wherein the best matching archived head position determines during working phase to which segment the user's gaze is directed to.

For head position detection two techniques are presented in detail, one is based on contour extraction in the captured image and a step of comparing the extracted contour with archived contours which have been extracted and archived during said training phase, and wherein the best matching archived contour image determines to which segment the user's gaze is directed to. By extracting and comparing contours, the amount of data in the captured images is drastically reduced, so that the amount of data that is to be processed is also reduced so that fewer resources are required for this task.

The second technique is based on "T"-symbol extraction which reduces the amount of data to be handled further down. The so-called "T" symbol is built by the line on which the eyes lie in combination with a line along the back of the nose. The extraction of the "T" symbol also helps to eliminate disturbing effects of other sections of the viewer's face, e.g. if he is speaking or making other movements with the mouth like chewing a chewing gum or others.

To further improve the accuracy of gaze direction determination it is proposed in addition to said head position processing to perform an eye position processing and a step of comparing the extracted eye position with archived eye positions. An adequate training phase for the eye position determination is also proposed. Preferably correction coordinates are determined as a result of comparing the extracted eye position with the archived eye positions and correction coordinates determine by which the view direction determination based on head position detection is to be corrected to result in a higher accuracy gaze direction determination. The technique is thus a combination of a coarse determination of the gaze direction with head position detection and a correction of such result with the eye position detection for a refinement of the gaze direction determination.

In the technique of eye position detection an interpolation technique is also proposed. This is carried out between the best matching archived eye position and the straight looking eye position from the additional training phase, for determining the correction coordinates for the current extracted eye position. Using this technique reduces the burden for the user in the additional training phase.

To improve the reading, particularly when reading on small screens like in Ebook readers or smart phones, it may be enough if only the vertical viewing direction is accurately detected. Starting from the identified vertical viewing direction is the corresponding line of text to which the gaze is directed, highlighted for the reader. In another embodiment, as a text section that is highlighted simply the sentence in which the focused area of the eye is positioned will be highlighted. Further alternatively, a predetermined number of lines of text or a whole paragraph is highlighted according to the determined gaze direction.

Even if the view direction detection in times do not exactly match the image area to be directed to the actual user's view, the experienced user can quickly select the desired range by head movement if fine adjustment by conventional mouse seems too cumbersome. Through the training and the constant use, the user will always be trained to work with the view direction controlled reading mode. Fine adjustment can be made at the beginning alternatively using the cursor control keys. Especially when reading texts the correct line can be selected by pressing the Up or Down button quickly.

Further advantages and details of the invention are described below with reference to the appended drawings. It is understood that the invention is not limited to the exemplary embodiments and that specified features can also expediently be combined and/or modified without departing from the scope of the present invention as defined in the appended claims.

BRIEF DESCRIPTION OF THE DRAWINGS

In the drawings:

FIG. 1 shows the principle arrangement when a user is sitting in front of a computer monitor equipped with a webcam;

FIG. 2 illustrates an example of the arrangement of a plurality of webcams at the housing of the computer monitor;

FIG. 3 illustrates an example of the arrangement of a stereo webcam at the housing of the computer monitor;

FIG. 4 illustrates an example of a segmentation of the computer monitor's screen into fields for detecting the user's gaze direction based on webcam image processing;

FIGS. 16-21 illustrate an improved example of aiding text reading based on view direction tracking.

DETAILED DESCRIPTION OF THE INVENTION

Figures 5, 6:
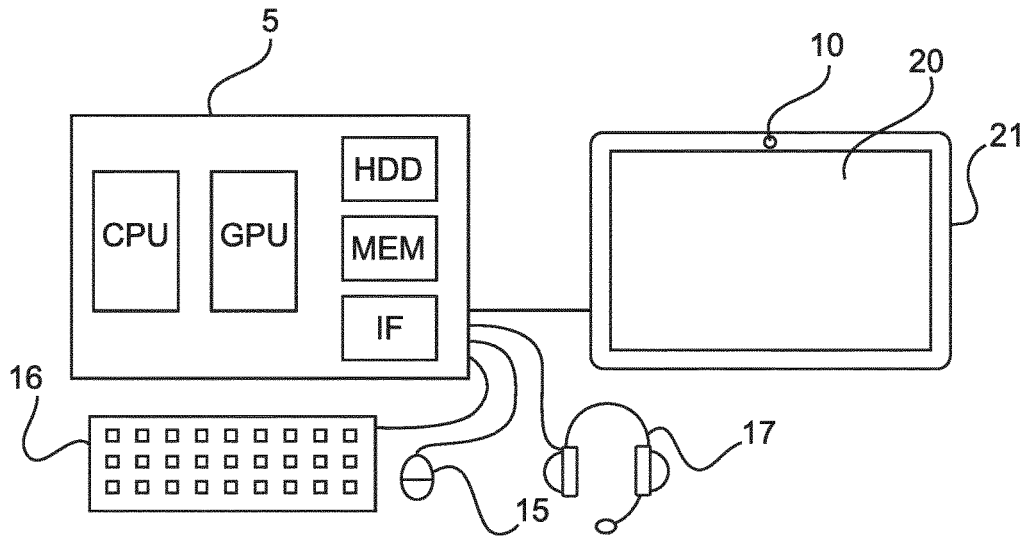
FIG. 5 illustrates an example of a finer segmentation of the computer monitor's screen into fields for detecting the user's gaze direction based on webcam image processing.
FIG. 6 shows a block diagram of a computer to which the computer monitor is connected.

To solve the problem described above, a line of sight controlled text highlighting is proposed. If the user is reading text on screen, then his view will be directed to the text passage he is actually reading. This view direction will be detected according to the invention by the computer and the corresponding focused text passage will be highlighted.

For view direction tracking as an embodiment, the image analysis of the captured picture of the built-in computer monitor webcam is proposed. Such view direction tracking will be employed preferably in a particular reading mode so that normal displaying of text in the usual manner can also be chosen by the user.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Thus, for example, it will be appreciated by those skilled in the art that the block diagram presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

FIG. 1 shows the principal arrangement when a user is reading text on a display device in front of him, e.g. a computer monitor. The view is directed on a focus point 18 on screen 20. The webcam 10 is observing the user when reading and captures a picture. By image analysis of the captured picture the connected computer determines the eye focus point on screen and highlights the corresponding text passage (this may be a single word or a plurality of words) to support the user in his reading. Because the read text passage is highlighted, the reader can easily find out the place where to continue reading in cases where his gaze temporarily loses the focus point. The reader is released from the operation of line tracking and can better concentrate on word recognition.

FIG. 2 shows an arrangement with a plurality of cameras 10, 11, 12, 13 which are positioned in the center of each side of the displays 21 housing. All cameras observe the reader and capture pictures during text reading. There are therefore four perspectives in which the reader is observed. This helps to increase the accuracy of view direction detection. The position of the striking points can be calculated more accurately. The calculation method is known in principle and is, for example, already used in the new "Torlinientechnik" at the 2014 FIFA World Cup. As an alternative a plenoptic camera may be used in this embodiment which basically corresponds to a whole camera array with plenty of cameras. Such cameras are found on mobile devices such as smart phones in prototypes.

FIG. 3 then shows another arrangement where a stereo camera 14 is positioned in the center of the upper border of the display device 21. The stereo camera is able to take a 3D image. Then it can be calculated based on a depth map in particular, the tilt of the head in horizontal and vertical direction in an accurate fashion. If the eye position is straight, the eye focus point can be estimated with high accuracy.

FIG. 4 shows a first embodiment of a segmentation of the display screen 20. The screen is divided into rectangular segments S1 to S9. The screen is in the format of a 16:9 aspect ratio. A cross is depicted in the center of segment S1. This segmentation will be shown on screen during a training phase for view direction detection. The segmentation in 9 equally sized segments shall illustrate the principle solution according to the invention. This segmentation however can be regarded as being insufficient for the purpose of aiding the user in text reading, particularly if the user is not reading over the full screen along the long side of the screen. The principle however is correct and can also be applied when a finer segmentation of screen is used. An example of a finer segmentation of the display screen is shown in FIG. 5 with a total of 180 segments S1 to S180 for a 16:9 screen. This segmentation is right for a 15.4" or 17" computer monitor screen but certainly and depending on the display size such segmentation could further be increased such that even more segments might be used. The use of a fixed sized raster with segments is advantageous if a document is read on the display screen that does not have text encoding, e.g. a PDF document. For text documents with text encoding such as DOC, TXT, ODF, etc. documents it is advantageous to adjust the segment size to the size of the displayed text, so that it is possible to highlight the text in text lines and to avoid a highlighting of texts which is not line-accurate. Of course it is possible to first perform a step of optical character recognition (OCR) in non-text documents such as PDF documents to be able to support the reading of text in the same way as in text documents.

FIG. 6 shows a block diagram of the computer 5. The computer monitor 21 is connected with the computer 5. Connected with the computer are keyboard 16 and mouse 15. The image processing for view direction determination is preferably performed in the graphical processing unit GPU. By this measure the CPU is released from this relatively complex task. As an alternative it could also be performed in the CPU or in parallel in the CPU and GPU in a cooperative manner. The archived images will be archived in hard disc drive HDD. Instead of a hard disc drive a solid state drive SSD can also be used. IF is the interface section and MEM is the computer's memory. Reference number 17 denotes a head set or microphone for allowing voice control and a specialized training method which will be explained later on.

Of course, the computer depicted in FIG. 5 is an example and it is expressively mentioned that the invention may be used in similar devices such as personal computers, notebook computers, tablet computers, smart phones, Ebook readers or TV sets. Such devices are equipped with display screens in the form of LCD display panels, LED display panels, OLED display panel, E-ink display panels, Plasma display panels and the like.

Figure 7:
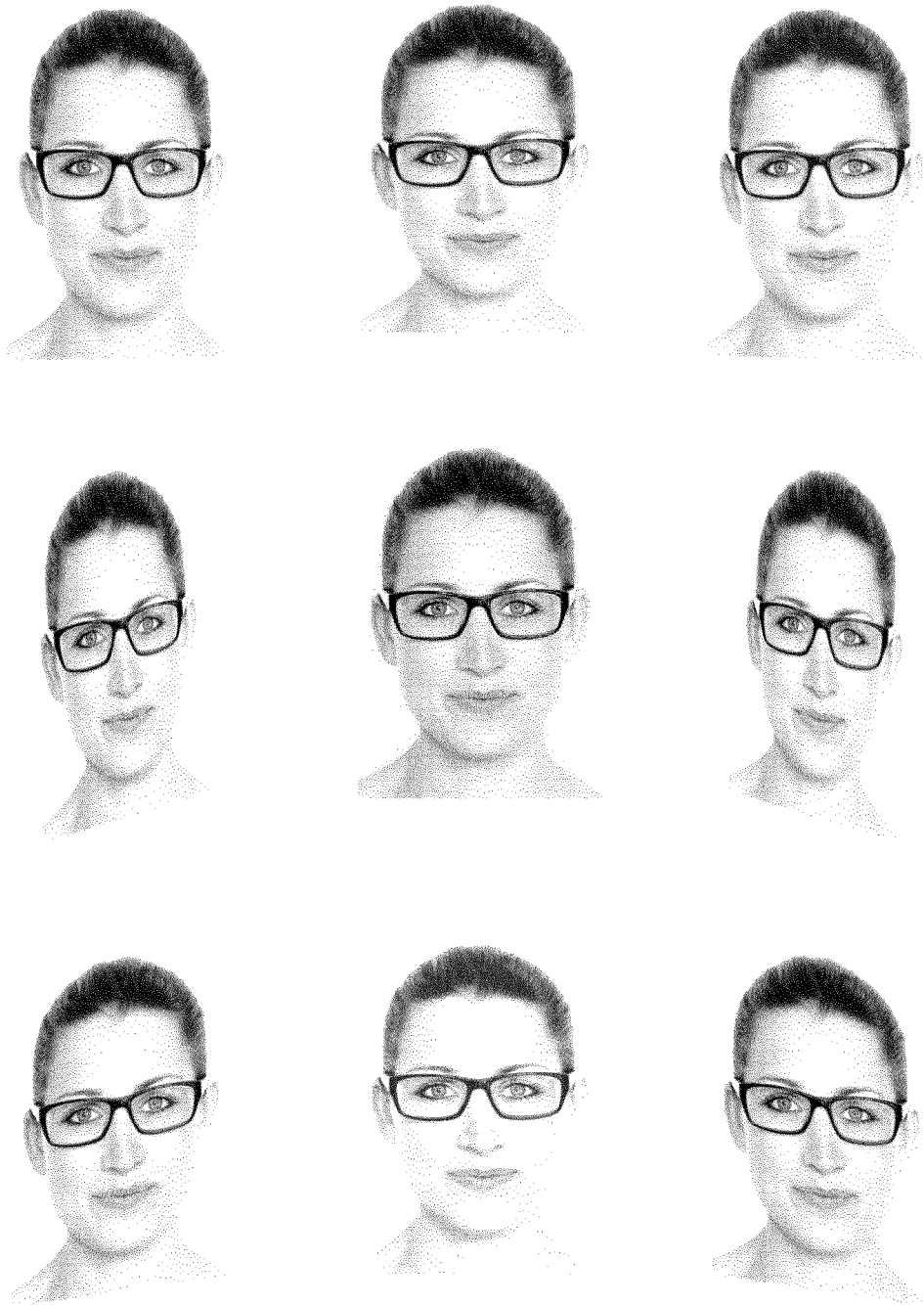
FIG. 7 shows webcam captured pictures in case of the webcam arrangement depicted in FIG. 1 captured during a training phase with screen segmentation according to FIG. 3.

In the following it will be explained different embodiments for gaze direction detection. FIG. 7 illustrates the captured pictures captured during training phase when the user is staring at the depicted cross in the center of each segment S1 to S9 depicted in FIG. 4. It is seen that the camera 10 is seeing the user's face with different tilts corresponding to the required head movement when looking straight at the cross in each segment. Ideally the user does not move the eyes when looking at the cross but is turning the head in the right direction for looking at the cross straight. Since the gaze direction determination is based on image comparison, it is proposed to use image processing before archiving a picture during training phase. Any image processing which reduces the amount of data in the picture by delivering good results during comparison is suitable. As a first example of data reduction image processing it is mentioned a contour processing.

Figure 8:
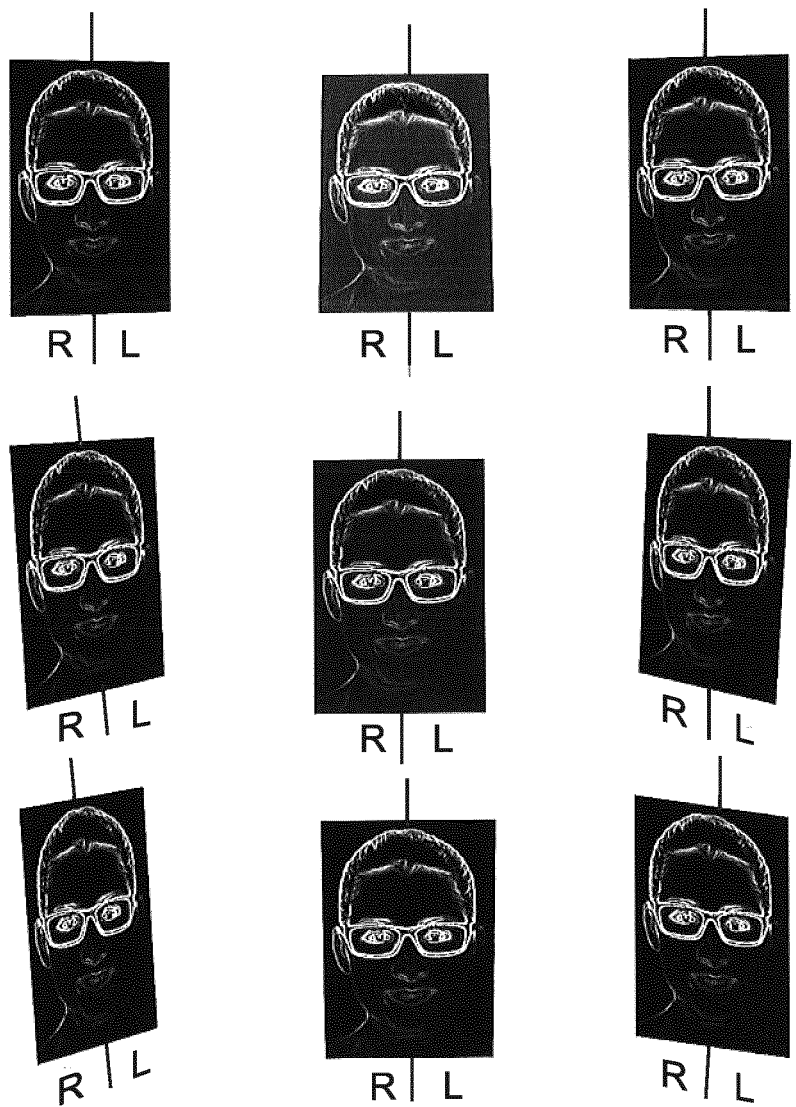
FIG. 8 shows the pictures of FIG. 7 after contour extraction processing.

A computation of the contours of the users face in the captured images is performed. FIG. 8 shows the extracted contours of the user's face for the images of FIG. 7. One such technique for contour extraction is, for example, described in U.S. Pat. No. 7,176,939 B2. In this technique, by means of a gradient filter, the regions of the image in which high gradients occur are determined. The contours are very prominent. However, other image processing method for highlighting the contours may also be considered for this. Thus, the program MS Word offers an image processing function with which the contours can be highlighted. Many image editing programs employ techniques to highlight contours. Other techniques are referred to as edge detection or edge processing technology and would be effective for the solution of the same problem in consideration. If only the contours for the image are used for comparison, further disturbing influences for the comparison are eliminated. As indicated in FIG. 8, the contour images can be divided into two parts, right and left half. This helps for eliminating ambiguous comparison results as will be explained below.

Figure 9:
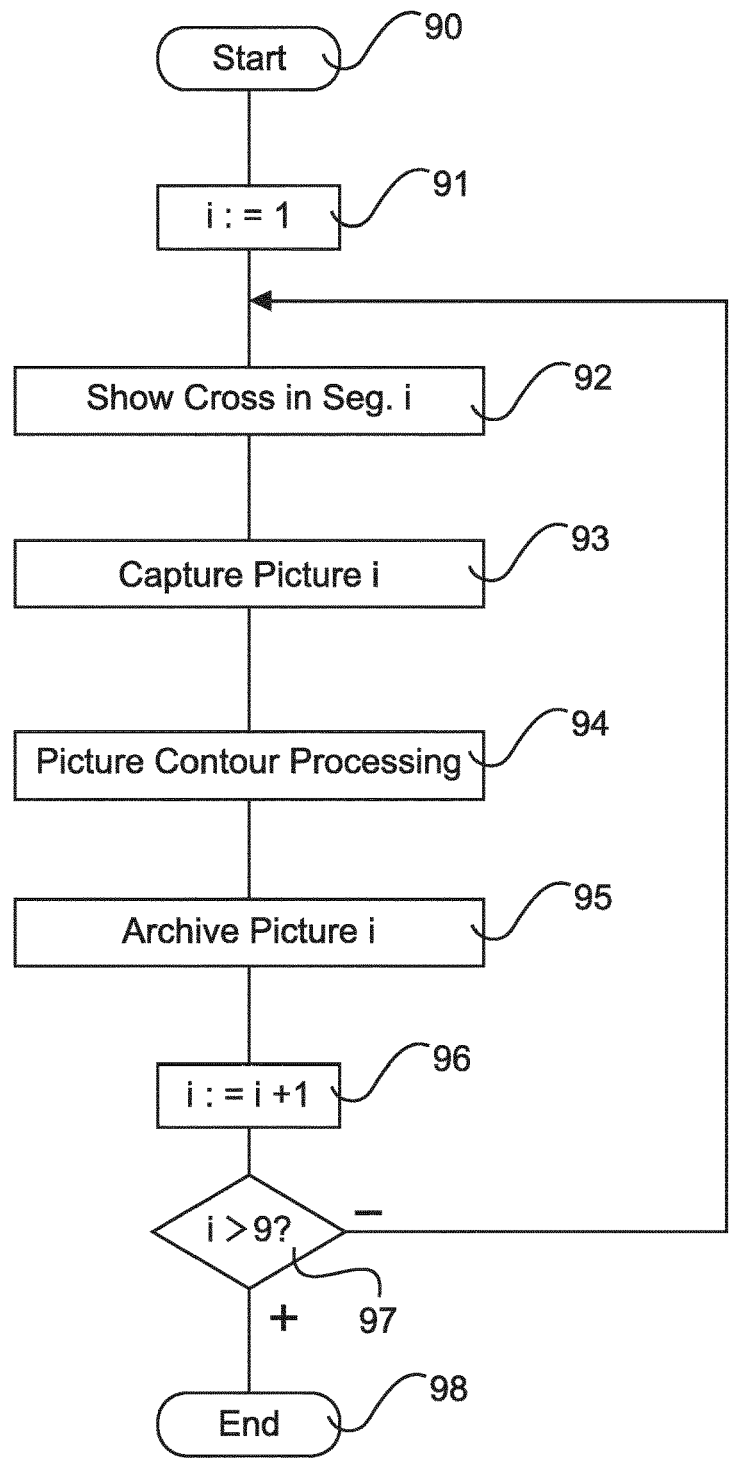
FIG. 9 shows a flow chart for a software program to be executed by the computer shown in FIG. 6 during a training phase for view direction detection.

First, it will be explained the training phase in more detail. Here, the user is prompted in the training phase to direct attention to a particular position 18 displayed on screen. This is illustrated in FIG. 4. It is the displayed cross in the center of segment S1 at which the user shall look straight. The camera 10 takes a picture and saves it. This is done for the different areas S1 to S9 in case of FIG. 4 or S1 to S180 in FIG. 5. An example of captured images during training is shown in FIG. 7. The same pictures are shown in FIG. 8 after extraction of the contours. When all areas have been covered several times, if necessary, the training is ended. The operation of the computer in training phase with a corresponding computer program is illustrated in FIG. 9. The start of the program is labeled with reference number 90. In step 91 an index i is set to the value 1. In step 92 a cross is displayed on screen 20 in the center of the segment with index i. The user looks at the cross and the camera takes a picture in step 93. It follows the picture contour processing for the captured image in step 94. The resulting image with extracted contours contains less data and is archived in step 95. In step 96 index i is incremented. In step 97 it is checked if the index i now exceeds the value 9. If not, the program branches back to step 92 and the next segment will be treated. If yes, the training phase is ended in step 98.

During operation, a captured current image is compared with the archived images of the training phase. The training image with the closest match then specifies what segment of the screen the gaze is directed to.

Figure 10:
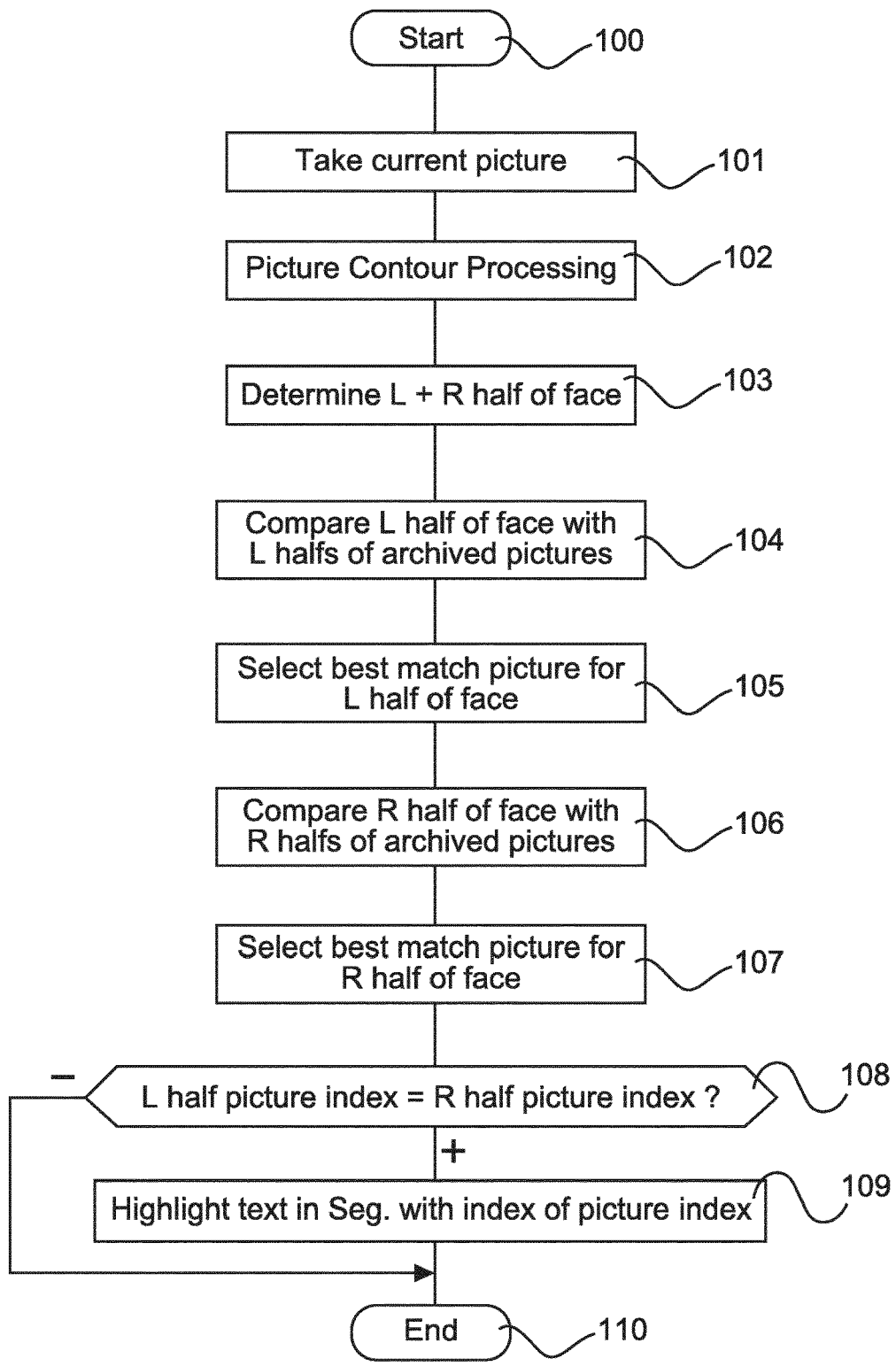
FIG. 10 shows a flow chart for a software program to be executed by the computer shown in FIG. 6 during a working phase for view direction detection.

The operation of the computer 5 in working phase with a corresponding computer program is illustrated in FIG. 10. The program starts at step 100. In step 101 the camera 10 takes a picture. It follows the contour processing in step 102. The resulting image with extracted contours is divided in left and right half like depicted in FIG. 8. In step 104 the computer 5 compares the left half of the contour image with the left halves of the archived contour images from training phase. The best matching image from training phase is selected. The simplest comparison operation looks at the sum of the video values in the two images to be compared. Another form is to build the difference in video values for each two corresponding pixels and summing up the square of the differences. The image with the smallest total square difference is the best matching image and is selected. Any other suitable form of performing the comparison operation might be used alternatively. The process continues in steps 106 and 107 where the same steps are performed for the right half of the captured image. Then in step 108 it will be checked if the picture index determined as the best match for the left picture is equal to the picture index determined as the best match for the right picture. The splitting of the contour images in left and right halves has the advantage that not the wrong side of the screen is mistakenly selected when the pixel differences of a whole picture would sum up to a similar value regardless of whether the reader is looking at the left side of the screen or the right side of the screen. When the two determined picture indexes match up in query 108, the text in the corresponding segment of the screen is highlighted in step 109. Preferably the segments are made small enough that only 1 to 5 words in a text line are highlighted. Of course, an embodiment that highlights more text during reading in a segment is also considered according to the invention. The decisive point is that the highlighted region follows the user's gaze direction during reading. The process ends in step 110. If the two picture indices don't match up in query 108, the text highlighting step 109 is omitted and the process ends in step 110 directly.

In the embodiment of FIGS. 8, 9 and 10 the picture contour extraction corresponds to the image processing which is used for gaze direction determination. Alternatively an evaluation of eye position, nose position, positions of prominent points of spectacles and or other distinctive points of the head or face of the operator may be done. For this purpose, and also for the first embodiment it is more advantageous to use instead of the webcams today often used with wide angle lens a webcam with telephoto lens or zoom lens. Such lenses capture the operators face in bigger size and more planar, such that the head movements are easier to detect.

Figure 11:
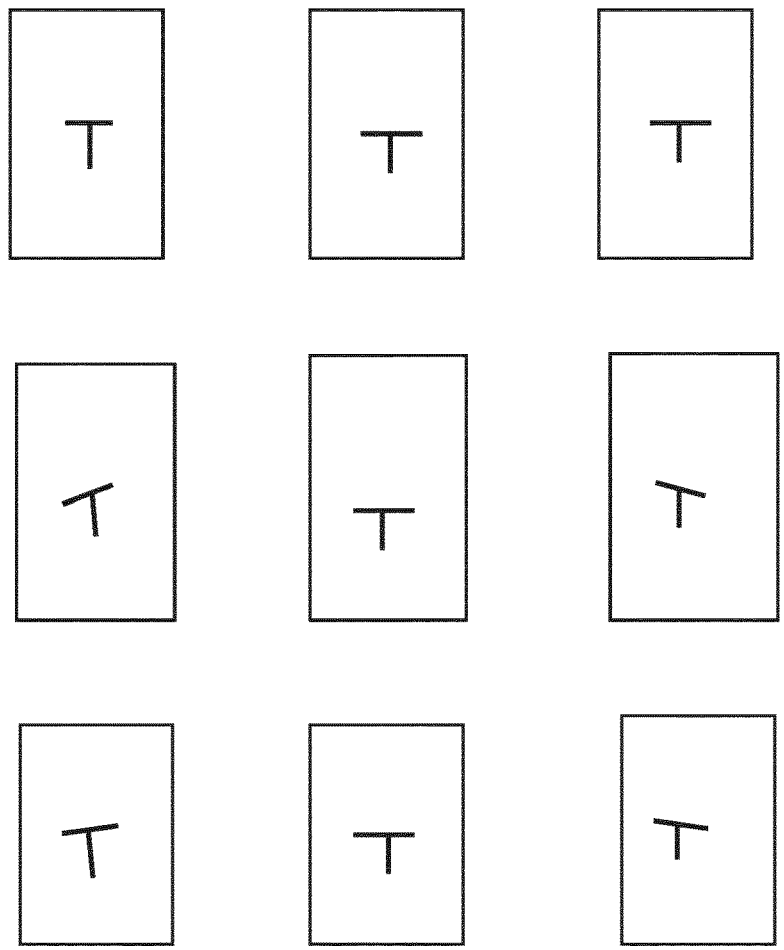
FIG. 11 shows the pictures of FIG. 7 after "T"-symbol extraction processing.

What delivers a good estimation of the gaze direction, is the extraction of a so-called "T"-symbol built by the line on which the eyes lie in combination with an axis of the nose. The images of FIG. 7 after "T"-symbol extraction are illustrated in FIG. 11. When the user turns his head when reading line-wise, the "T"-symbol is tilted, rotated and shifted at the same time. The exact position of the "T"-symbol can be translated into a view point on the screen if the viewer is not moving the eyes in addition to the head movement. The extraction of the "T" symbol helps to eliminate disturbing effects of other sections of the viewer's face, e.g. if he is speaking or making other movements with the mouth like chewing a chewing gum or others. Even if the user is supporting his head with his arm, it does not really disturb "T" symbol extraction. For extracting the "T"-symbol, known algorithms from photography may be used like red eye correction algorithm which determines the exact position of the pupils, the center of which define the end points of the upper line of the "T"-symbol. An algorithm for defining the lower line of the "T"-symbol is easy to implement. That algorithm determines the lowest point of the nose with the help of gradient determination or edge detection and creates a line from the midpoint of the upper "T"-symbol line to the lower end of the nose. Any other suitable algorithm for "T"-symbol extraction might be used instead.

To reduce the burden for the user during training phase, an interpolation technique may be used. That means that the training would not be performed in all screen segments S1 to S180 but only in a reduced number of segments distributed over the screen. For the intermediate screen segments positioned between two trained segments, the head positions would be calculated with interpolation and correspondingly archived. Particularly in the embodiment with "T"-symbol extraction this interpolation technique works well, since the "T"-symbol position is a linear function of the head turning in upper/lower direction starting from the screen center and head turning in the left/right direction starting from the screen center.

A problem with the above explained embodiments in which the view direction is determined based on head position detection is that, when reading text, the user does not look at each text passage straight. Usually the user can also use eye movement for focusing text. In that case the gaze direction determination based on head position tracking might not be accurate enough. To tackle this problem, an improved embodiment will be explained in the following. That solution requires an additional training method and a different working process. In general that solution starts out with the head position detection as explained above. The corresponding algorithm delivers an estimation of the view point on screen. Then by eye position detection and a corresponding translation into a corrected position of the estimated view point, the final view point is determined.

Figure 12:
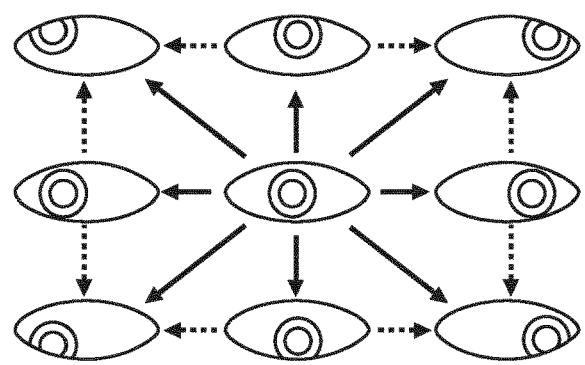
FIG. 12 illustrates the extreme eye positions captured during an additional training phase for view direction detection processing according to the invention.

FIG. 12 shows different eye positions and how they appear in the image captured by the camera 10. Since the camera 10 captures the whole face of the reader, for determination of the eye position, there is a need of zooming in the image and extraction of the eye region in the face. The extreme eye positions when the user is looking at the upper left and right corner, lower left and right corner, center upper border, center lower border, center left border and center right border without head movement are depicted in FIG. 12. For determining the exact eye position, the centers of the pupils of the eyes are determined relative to the borders of the eyes, e.g. to the borders of the eye lids which normally can easily be extracted with image processing, e.g. edge detection. Then the center positions which correspond to the eye position can be compared with a current eye position during text reading. To use the center position of the pupils has the advantage that the center position is accurately to be determined even in different lighting situations where the size of the pupils may vary.

Figure 13:
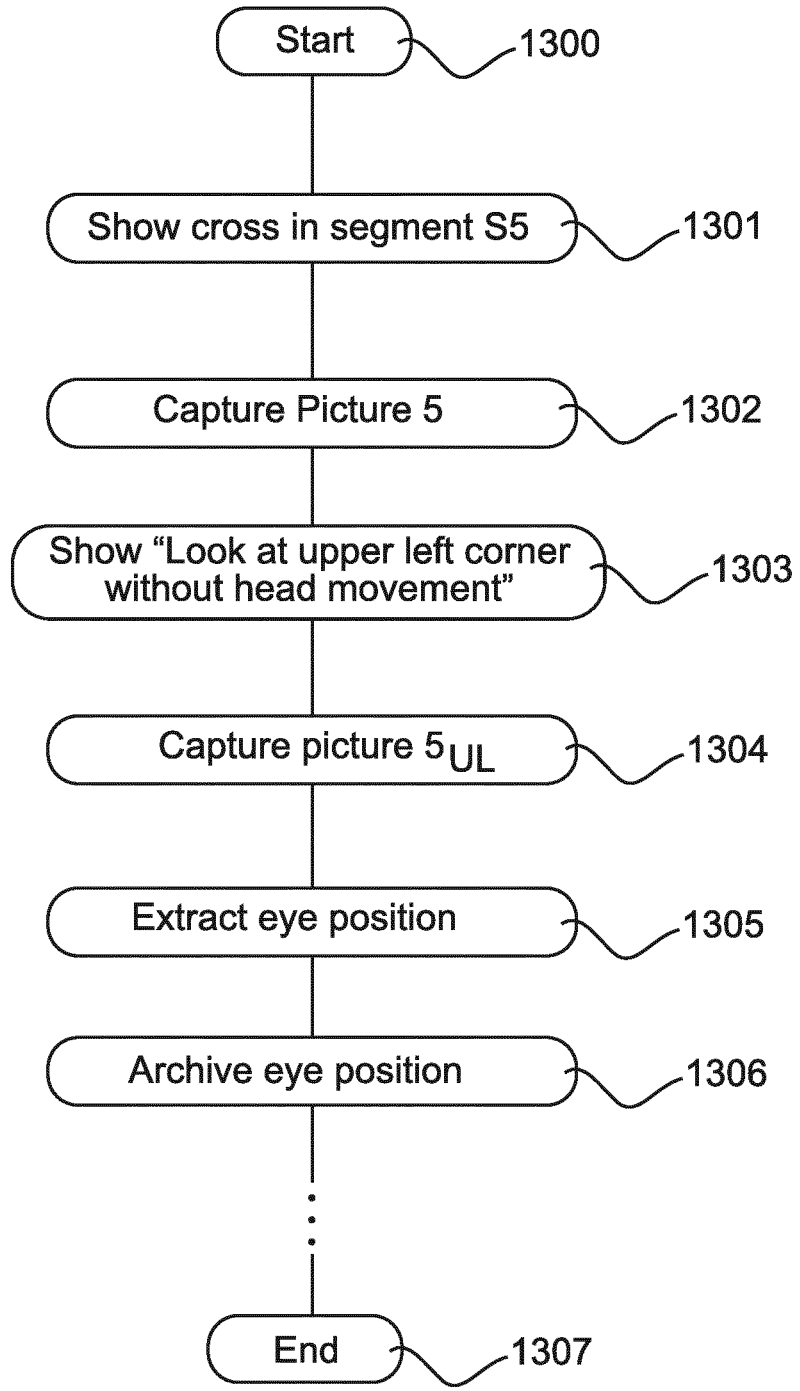
FIG. 13 shows a flow chart for a software program to be executed by the computer shown in FIG. 6 during a training phase for calibrating the eye position detection.

The operation of the computer 5 in the additional training phase with a corresponding computer program is illustrated in FIG. 13. The start of the additional training phase is in step 1300. In step 1301 a cross is shown on screen in the center of segment 5 in FIG. 4. An image is captured in step 1302. In step 1303 it is displayed a message "Look at upper left corner without head movement!". A cross might be shown in the upper left corner, too. The user looks at the upper left corner and an image is captured in step 1304. What follows in step 1305 is the eye position extraction with image processing as above mentioned. The extracted eye position will be archived in step 1306. In the following steps (not shown) the user is prompted to look at upper right corner, lower left corner, lower right corner, center of upper border, center of lower border, center of left border and center of right border. In each case an image is captured, the eye position will be extracted and archived like for the upper left corner. The additional training phase is then ended in step 137.

Figure 14:
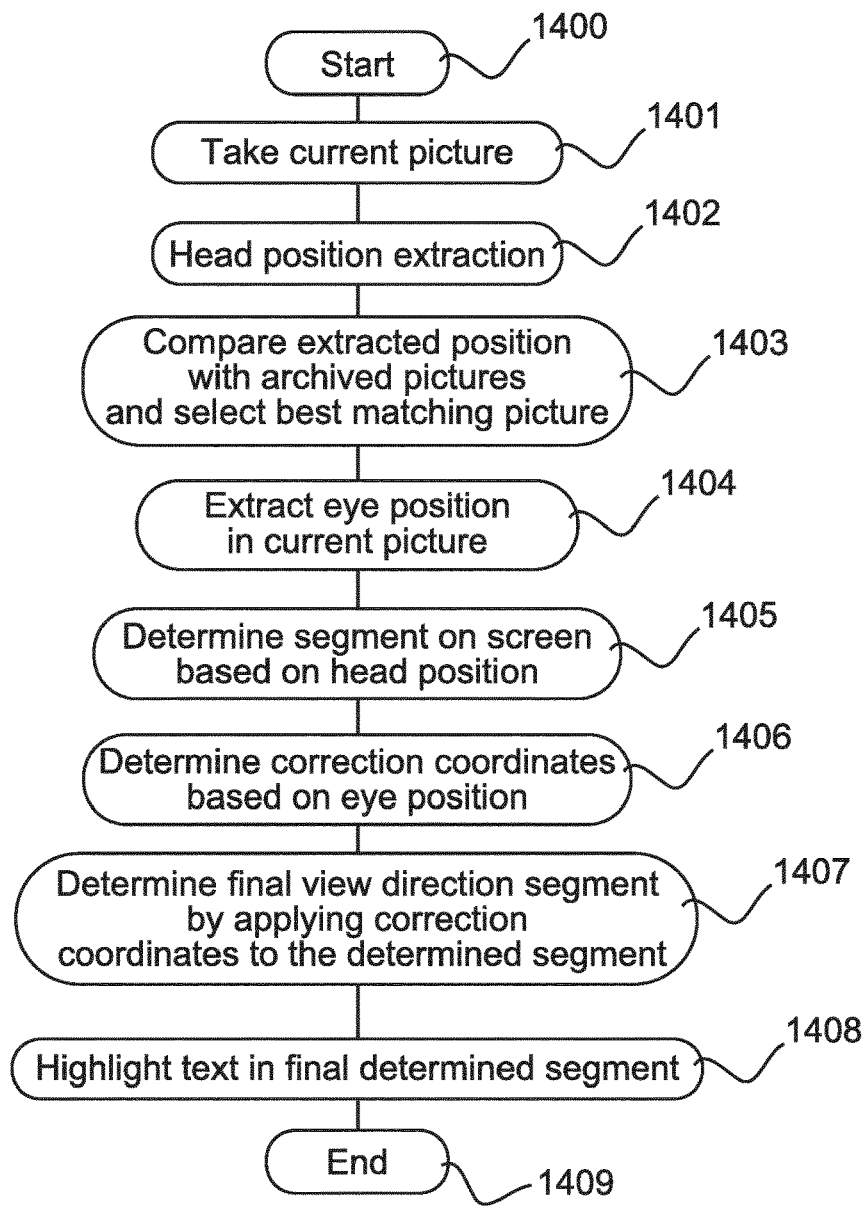
FIG. 14 shows a flow chart for a software program to be executed by the computer shown in FIG. 6 during a working phase in which head position extraction and eye position extraction are combined for view direction detection.

Next the operation of the computer 5 in the modified working phase is explained with the help of FIG. 14. The start of the working phase is with step 1400. The user looks at the screen during reading and an image is captured with camera 10 in 1401. With image processing (e.g. contour extraction or "T"-symbol extraction) the head position is determined in step 1402. By comparing the head position with the archived images the best matching image is determined in step 1403. This is translated into the segment of the screen to which the best matching archived image belongs in step 1404. Afterwards the eye position is extracted from the current image in 1405. Since the extracted eye position most of the time lies in between the extreme positions archived in the additional training phase and the center position, the correction coordinates are determined with the help of interpolation. Such interpolation techniques are available, for example in the IEEE article "Calibration-free Gaze Tracking Using Particle Filter" by PhiBang Ngyuen, Julien Fleureau, Christel Chamaret and Philippe Guillotel, Multimedia and Expo (ICME), 2013 IEEE International Conference on, 15-19 Jul. 2013, San Jose, Calif., USA. These correction coordinates provide the information how many segments to the left or right and how many segments up or down starting from the determined view point in step 1402 the focus point of the user's gaze lies on screen. The correction coordinates are calculated in step 1406. In step 1407 the correction coordinates are applied to the determined segment on screen based on head position detection and the final view point is determined this way. The highlighting of text then occurs in the final determined screen segment in step 1408. The process ends in step 1409. Of course, since text reading is a continuous task, instead of ending the process in 1409 the whole process may start anew from the beginning with step 1400 until a predetermined ending criterion is fulfilled.

Of course, a trade-off is being made between how fine the segmentation of the screen can be made and the expenditure for comparing images. For the case a segmentation of the screen cannot be made finer for head position detection, it is proposed to also determine the view point based on head position detection in step 1404 with the help of an interpolation technique like in the step 1406.

Figure 15:
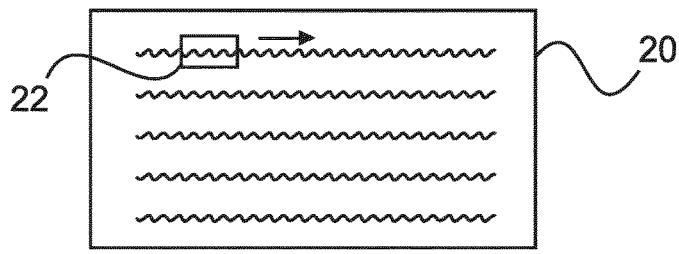
FIG. 15 shows the principle application of view direction detection for the purpose of aiding text reading.

The way the text is highlighted during reading is principally illustrated in FIG. 15. The user's gaze is tracked and the highlighted region 22 moves over the screen line-wise from left to right and top to down. This way it is very convenient for the user's eye to read the text since the task of line-tracking is done by the computer. Since the focus area is highlighted, even word recognition is eased for the user. FIG. 16 shows the start of reading the second paragraph of a page. Just the first expression "Fig" is highlighted. In FIG. 17 the next text section is highlighted as the reader is carrying on reading. It should be noted, that in this embodiment the first expression remains highlighted as well. In FIG. 18 it is shown that the whole first sentence is highlighted when the user fixates the end of the first sentence. This way the user may quickly jump back to the beginning of the sentence in case he thinks that he did not understand the sentence fully, which happens quite often in reading complicated texts. If the user's gaze jumps back to the beginning of the sentence, the highlighting of the sentence starts out anew from the beginning. If the user understands the sentence perfectly and proceeds further in reading, the beginning of the next sentence will be highlighted and the highlighting of the first sentence will be cancelled, see FIG. 19. FIG. 20 shows an intermediate state, when the user has read the first four words of the second sentence. Finally, FIG. 21 shows the highlighting of the complete second sentence. In all FIGS. 16 to 21 for improving legibility the font in the highlighted text section has been modified from originally Calibri (Body) 11 pts to Microsoft Sans Serif 11 pts.

In a further embodiment the highlighted text region can precede the actual gaze direction in one or more segments of the screen. This can be useful since it provides a better orientation to the user's eye, so that the gaze may follow the preceding highlighting region.

The text section in which the focus progresses can be highlighted for the reader through frame, underlining, character color, background color, different font, bigger line spacing, colour gradient, text effect like 3D effect or the like in any combination.

As a further improvement, it can be used in the highlighted section of text a different typography (font, font size, font style like bold or italic, etc.). As appropriate font for better legibility a sans serif font such as Microsoft Sans Serif or Gill Sans comes into question. In the focus area an increase of the font size, is used at the eye fixation position for highlighting to improve the legibility.

Now, when the user is starting reading with an unusual position of his head, and the best matching archived image does not correctly reflect the starting position of reading, the user is allowed to override the proposed starting position by reading aloud the paragraph number on screen from where he wants to start. So by saying the words "second paragraph", the computer starts highlighting text from the beginning of the second text paragraph on screen. As an alternative he may read the page and line where he wants to start or the column and line where he wants to start reading. Further alternatively the user may select the starting position with the help of the computer mouse or touchpad. By clicking on a paragraph it is determined that the view tracking reading mode shall start from the beginning of the selected paragraph.

In a further embodiment in which the viewing direction is to be detected more accurately, the user is prompted during training to read a displayed text aloud. During reading the view is migrating further from eye fixation to eye fixation. It is recorded here a sequence of images. This can be done in form of a conventional video recording. The number of images which is taken, then corresponds to the usual speed of 25 frames/s or 30 frames/s. Same time, since the tone is also recorded via the microphone 17, the computer through sound analysis can determine the exact time at which the reader has targeted specific text passages and then archives the associated matching picture or the corresponding image processed picture. During operation, these archived images are accessible and are compared with the image for the current viewing direction.

There is another embodiment which is disclosed, here. In that embodiment gaze direction detection is not continuously done. The gaze direction detection will be performed from time to time only or in periodic fashion with a certain time distance. A typical time distance for the periodically solution is e.g. every 10 to 30 seconds. The movement of the highlighting region however continues with an average speed also in the interval where the gaze direction is not detected. The speed with which the front of the highlight region moves in that interval, can be estimated based on the determined movement speed from the previous interval. It is simple to estimate the movement speed by dividing the number of characters, words or lines by the time distance inbetween two gaze direction determination steps. Of course the deviation from the actual speed will be adjusted/corrected when the next gaze direction determination has been performed. Such an embodiment is very resource saving in terms of processor load and/or battery capacity if it is a handheld device. To have the effect of a better guidance of the reader's gaze, the estimated movement speed may be increased by a certain value or percentage. Thus, the highlighting region precedes a bit the actual view direction and the eye can better follow the text line during reading.

With a pause button or stop button the user can freeze the highlighted area on screen. The gaze tracking is interrupted at that point in time. When the user presses the pause button again or presses a start button, gaze tracking will be resumed and the highlighting on screen continues as before. This way, the user is supported in finding the place where he stopped reading, quickly.

The invention may also be used for controlling with view direction control the mouse pointer. If the viewing direction is not detected accurately enough for pointing at a menu option on screen, then the pointer is set to the appropriate segment S1 to S180 of the screen image. The exact positioning of the mouse cursor is then made with the conventional mouse or touch pad. By pre-selecting the image area using gaze control to the executive mouse movements are reduced. When the focus of the eyes can be calculated accurately enough, to dispense with the mouse or the touchpad is possible. Then only the mouse buttons remain, but these can then be provided on the keyboard.

If the user wants to interrupt the gaze control of the mouse, pressing a pause button is sufficient. Such pause buttons are provided on the keyboards today usually for controlling the DVD drive of the computer and can be used with the same for the new purpose. The cursor then remains at the same position on the screen during intermission. The user can let his gaze wander freely, without the mouse pointer changing its position. Such a pause button may also be used for text reading with gaze determination. It goes without saying that a different key may be used instead the pause button for the same purpose.

The disclosure is not restricted to the exemplary embodiments described here. There is scope for many different adaptations and developments which are also considered to belong to the disclosure.

It is to be understood that the proposed method and apparatus may be implemented in various forms of hardware, software, firmware, special purpose processors, or a combination thereof. Special purpose processors may include application specific integrated circuits (ASICs), reduced instruction set computers (RISCs) and/or field programmable gate arrays (FPGAs). Preferably, the proposed method and apparatus is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device, an alert-output-device/communication device and a printing device.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

It is to be further understood that, because some of the constituent system components and method steps depicted in the accompanying figures are preferably implemented in software, the actual connections between the system components (or the process steps) may differ depending upon the manner in which the proposed method and apparatus is programmed. Given the teachings herein, one of ordinary skill in the related art will be able to contemplate these and similar implementations or configurations of the proposed method and apparatus.

The invention claimed is:

1. A method for controlling the displaying of text for aiding reading on a display device, comprising the steps of: displaying the text on a display screen; determining, using image processing, a view direction of a user while reading text on the display screen by capturing an image of the user's face by a camera, the image processing including segmenting a display screen area into a plurality of segments and determining, using head position processing, to which segment the user's gaze is directed, the head position processing including extracting a contour in the captured image and comparing the extracted contour in the captured image with archived contours which have been extracted and archived during a training phase, a best matching archived contour image determines to which segment the user's gaze is directed to; highlighting text in a segment of the display screen which corresponds to the determined view direction; and tracking the user's view direction by successively determining the view direction of the user while reading text on the display screen and successively highlighting text in the corresponding segments of the display screen, wherein the highlighting of text during view direction tracking is started at the beginning of a sentence when the user's view is directed to the corresponding segment of the display screen, wherein successively more and more sections of said sentence are highlighted such that when the user's view is directed to the end of said sentence the whole sentence is highlighted on the display screen, and wherein the training phase includes: asking the user to look at certain segments of the display screen; capturing a corresponding image; and extracting and archiving the contour corresponding to the head position in the captured image.

2. The method according to claim 1, wherein, when the user's view is directed to the beginning of a following sentence in the text on the display screen, the highlighting of the previous sentence is canceled and highlighting of the following sentence is started by highlighting the first section of the following sentence.

3. The method according to claim 1, wherein a front of the highlighted text area precedes the determined view direction and a successive gaze direction by one or more segments of the display screen.

4. The method according to claim 1, wherein the view direction tracking is performed successively from time to time or periodically with a certain time distance and wherein a highlighting region advances with a determined speed in an interval between two successive view direction tracking steps.

5. The method according to claim 4, wherein the determined speed with which the highlight region advances in the interval between two successive view direction tracking steps is derived from a determined speed in one or more of the previous intervals.

6. The method according to claim 1, wherein the head position processing includes a step of "T"-symbol extraction in the captured image and a step of comparing the extracted "T"-symbol with archived "T"-symbols which have been extracted and archived during said training phase, wherein a best matching archived "T"-symbol image determines to which segment the user's gaze is directed to.

7. The method according to claim 6, wherein for "T"-symbol extraction a first line is drawn connecting determined centers of the user's eyes in the captured image and a second line is drawn along a back of the user's nose in the captured image.

8. The method according to claim 1, wherein in addition to said head position processing an eye position processing step is performed and a step of comparing an extracted eye position with archived eye positions is performed for increasing the accuracy of gaze direction determination.

9. The method according to claim 8, wherein for eye position processing an additional training phase is absolved with the user in which the user is asked to look straight at a dedicated segment of the display screen and to look at a plurality of segments at a border of the display screen without moving the user's head, wherein in each case a corresponding image is captured of which in each case a corresponding eye position is extracted and archived.

10. The method according to claim 8, wherein the extracted eye position is compared with the archived eye positions and wherein a best matching archived eye position determines correction coordinates by which the view direction determination based on head position detection is to be corrected to result in a more accurate gaze direction determination.

11. The method according to claim 8, wherein an interpolation is carried out between a best matching archived eye position and a straight looking eye position from an additional training phase, for determining the correction coordinates for the extracted eye position.

12. A non-transitory computer readable storage medium having computer readable programming code stored thereon to perform a method, the method comprising: displaying the text on a display screen; determining, using image processing, a view direction of a user while reading text on the display screen by capturing an image of the user's face by a camera, the image processing including segmenting a display screen area into a plurality of segments and determining, using head position processing, to which segment the user's gaze is directed, the head position processing including extracting a contour in the captured image and comparing the extracted contour in the captured image with archived contours which have been extracted and archived during a training phase, a best matching archived contour image determines to which segment the user's gaze is directed to; highlighting text in a segment of the display screen which corresponds to the determined view direction; and tracking the user's view direction by successively determining the view direction of the user while reading text on the display screen and successively highlighting text in the corresponding segments of the display screen, wherein the highlighting of text during view direction tracking is started at the beginning of a sentence when the user's view is directed to the corresponding segment of the display screen, wherein successively more and more sections of said sentence are highlighted such that when the user's view is directed to the end of said sentence the whole sentence is highlighted on the display screen, and wherein the training phase includes: asking the user to look at certain segments of the display screen; capturing a corresponding image;
and extracting and archiving the contour corresponding to the head position in the captured image.

* * * * *